Patented Apr. 19, 1927.

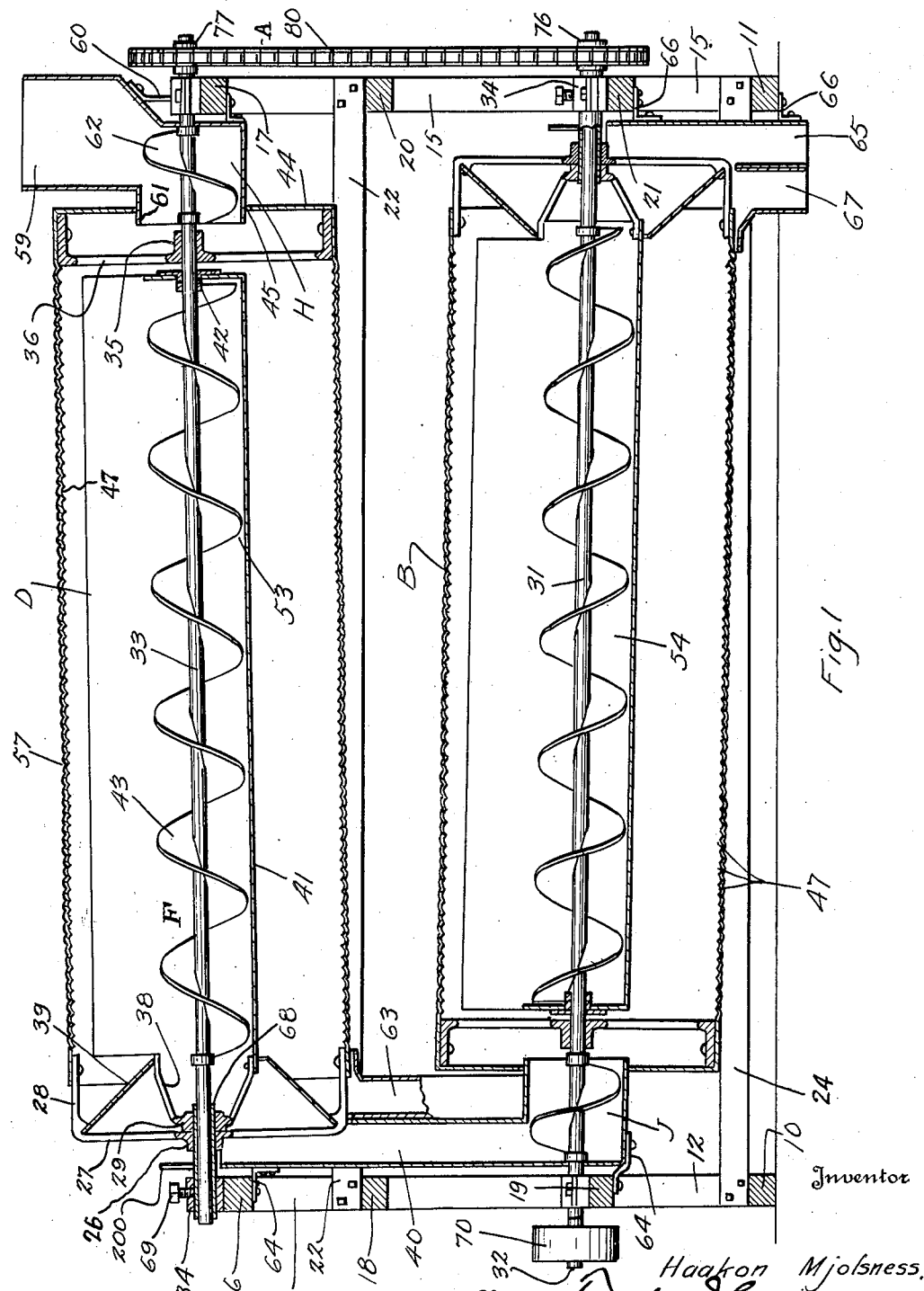

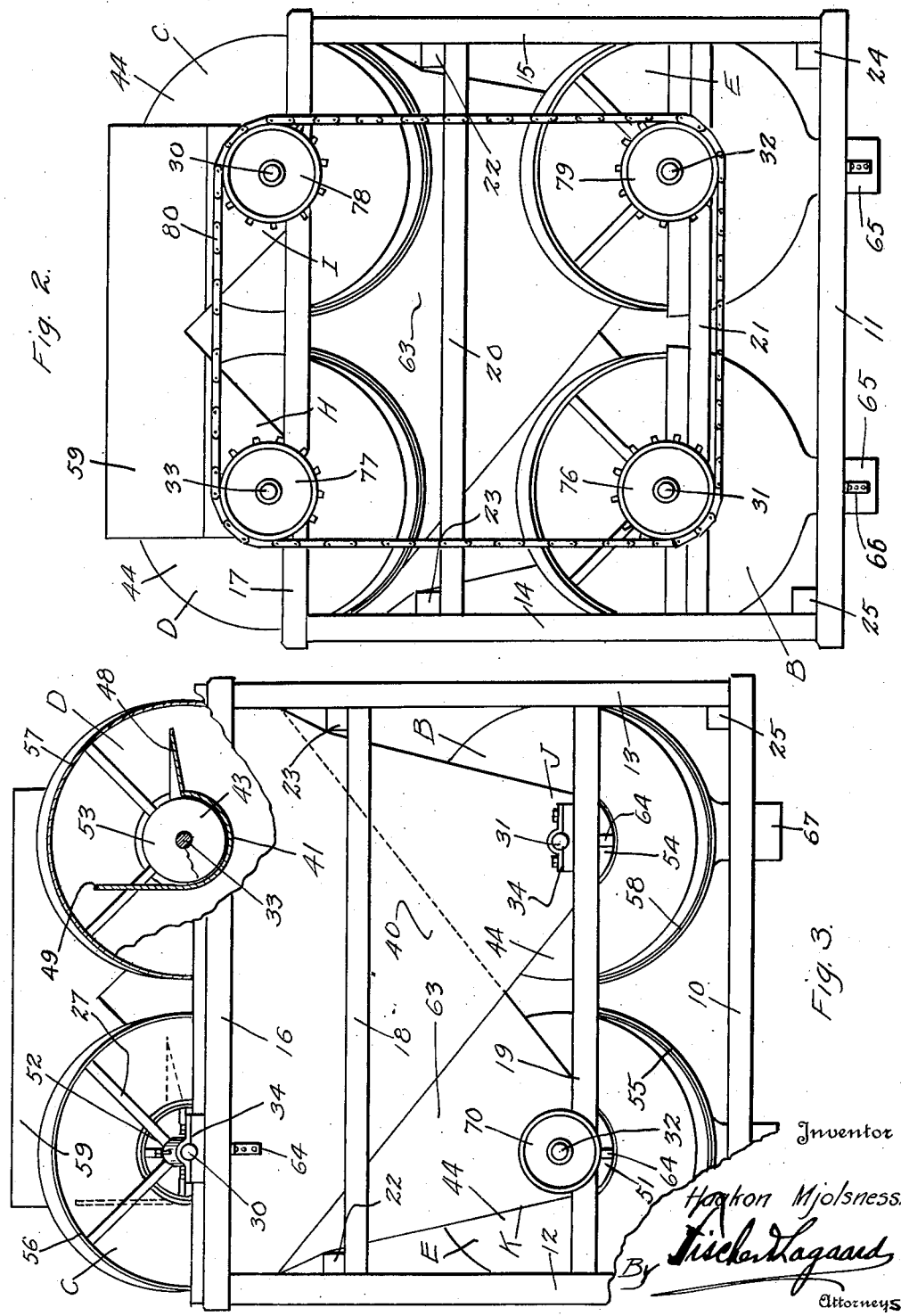

1,625,088

UNITED STATES PATENT OFFICE.

HAAKON MJOLSNESS, OF CHAFFEE, NORTH DAKOTA.

GRAIN SEPARATOR.

Application filed April 12, 1923. Serial No. 631,601.

My invention relates to grain separators and has for its object to provide a simple device for effectively separating oats and small seed from wheat and similar grain.

Another object of the invention is to provide an indented cylinder adapted to receive the kernels of wheat and elevate the same above the bottom of the cylinder, and to further provide a receiving member in which the said kernels of wheat are discharged when the same reach a predetermined height along the sides of the cylinder.

A further object is to provide a screw conveyor within the receiving means for collecting the wheat, which screw conveyor is adapted to discharge the wheat at the end of the machine through a suitable spout.

A still further object is to provide a single shaft for supporting and operating both the cylinder and the screw conveyor.

Another object resides in providing a feed conveyor secured to the end of said shaft for feeding the grain into the cylinder.

A still further object resides in supporting the cylinder upon two spiders, one of which extends outwardly beyond the end of the cylinder, and to position within the cylinder a conical baffle adapted to extend up to said conveyor for separating the discharge from said conveyor and cylinder.

Another object of the invention is to provide four cylinders arranged two abreast, one above the other and to provide a feeding device adapted to simultaneously feed both of the upper cylinders, a discharge device adapted to take the discharge from both of the upper cylinders and feed the same into one of the lower cylinders and another discharge device adapted to take the discharge from both of the upper conveyor troughs and discharge the same into the other lower cylinder and to provide independent discharges from the cylinders and conveyor troughs of both of the lower machines.

The full objects and advantages of my invention will be found in the detailed description thereof and are particularly pointed out in the claims.

In the drawings illustrating my invention in one form:

Figure 1 is a longitudinal sectional view of my invention showing the construction of the same.

Figure 2 is an end view of the invention as viewed from the drive end of the machine.

Figure 3 is a view similar to Figure 2 taken from the other end of the machine.

The framework for supporting my invention is illustrated in its entirety at A and consists of two transversely positioned skid members 10 and 11 to which are rigidly attached four uprights 12, 13, 14 and 15. Two headers 16 and 17 are rigidly bolted upon the said uprights at the tops of the same. In addition to the headers 16, and 17, I further provide four additional supporting members 18, 19, 20 and 21 which are secured between the uprights 13, 15, 12, and 14, as clearly shown in the drawings. To the frame members 18 and 20 and to the skid members 10 and 11, a number of longitudinal rails 22, 23, 24 and 25 are attached which serve in completing and tying together the framework of the invention.

For supporting the separating units of my invention, I provide four shafts 30, 31, 32 and 33 which are journalled in bearings 34 secured to the headers 16 and 17 and to the cross members 21 and 19 of the framework of the invention. Upon each of these shafts are mounted separating units B, C, D and E, which units are substantially identical in construction and operate in the same manner. These various units comprise conveyors 51, 52, 53 and 54 and cylinders 55, 56, 57 and 58, which operate to separate the smaller grain from the larger grain in a manner which will be presently described, the larger grains being retained in the various cylinders and discharged from the end of the same while the smaller grains are collected by the said conveyors and discharged therefrom. In view of the similarity of said units, the unit D will be described in detail, since the same construction may be employed with the other units, if desired.

The separating unit D, as best shown in Figure 1, is mounted upon shaft 33, as indicated. This shaft, as before stated, is rotatably supported in bearings 34 attached to the headers 16 and 17 of frame A. Upon one end of shaft 33 is positioned a spider 35 having outwardly extending arms 36. The cylinder 57 is concentrically positioned relative to the shaft 33 and is supported at one end upon the spider 35 to which said cylinder is securely attached. At the other end, cylinder 57 is secured to another spider 26 mounted upon the shaft 33, which spider is formed with arms 27 having longitudinal extensions 28 connected to said cylinder, thus bringing the said spider outwardly beyond the end of cylinder 57. In this manner, cylinder 57 is rotatably driven by shaft 33 and to rotate concentrically therewith.

Within the interior of cylinder 57 is positioned a semi-circular conveyor trough 41, which has attached to it at its inner end a bearing 42 which is journalled upon the shaft 33 adjacent the spider 35. Trough 41 is rigidly secured at its other end to a spider 29 formed with outwardly extending arms 38, which spider is secured to a tube 68 journalled upon the end of shaft 33. Tube 68 passes through bearing 34 and is firmly held in place within said bearing by means of a set screw 69. With this construction, the trough 41 is firmly held stationary relative to the frame of the invention, while the shaft 33 is rotatably mounted in the tube 68 and bearing 34 at the other end of the machine. For adjusting the position of the trough 41 axially within the machine, a lever 200 is provided, which is rigidly secured to tube 68 in any well-known manner. When set screw 69 is released, the entire trough 41 may be moved by means of this lever. Within trough 41 and rigidly secured to shaft 33 is a screw conveyor flight 43, which is adapted to cause the grain deposited within said trough to travel along the same from the feeding end of said trough to the free or discharge end of the same.

The separation of the grain in the machine is accomplished as follows: At the end of cylinder 57 is provided an inwardly turned flange 44 formed with an opening 45 in the center of the same. The grain to be cleaned is discharged through the opening 45 into cylinder 57 where the same passes by the spider 35 and into the interior of the said cylinder. The cylinder 57 is formed with a number of indentations 47 which are adapted to receive the smaller kernels of grain and to carry the same upwardly along the sides of the machine to a point somewhat above the center of the shaft 33. Issuing outwardly from the trough 41, I provide an apron 48 which extends from a portion of said trough near the center of the same at a slightly upwardly inclined angle to within a short distance of the interior of the cylinder 57. As the grain contained within the pockets or indentations 47 is raised by means of rotation of said cylinder, the grain follows the said cylinder until the same is caused to fall by gravity being collected by the apron 48 and discharged into the conveyor trough 41 where the conveyor flights 43 advance the same to the discharge end of the said conveyor. To prevent grain from being thrown completely across the conveyor trough 41, a guard 49 is provided which extends upwardly from the opposite wall of said conveyor trough and to within a short distance of the upper surface of the interior of cylinder 57. As will be noted, cylinder 57 is positioned in inclined relation relative to frame A so that, as the cylinder rotates, the grain within it gradually travels toward the open end of said cylinder where the same may be collected in a manner to be presently described. By this method, the wheat and smaller seeds present in the raw grain is collected by the conveyor F and discharged through the same, while the oats and other foreign matter of larger dimensions than the wheat is caused to continuously roll about in cylinder 57 and to be discharged out of the open end of the same, thereby effecting a separation between the wheat and smaller seeds and oats and other large foreign materials.

In the operation of my invention, the two upper separating units C and D are both used for making the first separation of the grain. For feeding these separating units D and C, I provide a hopper 59 which is attached to the header 17 of frame member A by means of supporting brackets 60. This hopper is bifurcated at its center and is connected with two chutes H and I having troughs 61 which pass through the openings 45 of the two cylinders 57 and 56 respectively, and which are concentrically arranged relative to shafts 30 and 33. Within the troughs 61 are positioned short conveyor flights 62 which are rigidly attached to the shafts 30 and 33. These chutes H and I serve to discharge the grain past the flange 44 and into the interior of the cylinder where the same takes the course previously described.

As previously described, the wheat and small seeds are thrown into trough 41, while the oats and larger foreign substances remain in the bottoms of cylinders 56 and 57. In the particular adaptation of my invention illustrated in the drawings, the separating unit B is used for recleaning the oats discharged from cylinders 56 and 57, while the separating unit E is used for separating the small seed from the wheat which leaves the conveyors 52 and 53. For accomplishing these results, the following construction is employed: It will be noted in Fig. 1 that the trough 41 and cylinder 57 terminate at substantially the same point while the spiders 27 and 29 extend outwardly beyond the ends of the same. For providing separate discharges for the wheat and oats, I employ a conical shaped deflector 39 which is attached to the arms 28 of spider 27 at the corners of the same. This deflector runs inwardly to a position just beyond the end of trough 41 and rotates with cylinder 57 in close proximity to the exterior of said trough. With this arrangement, the oats are discharged below said deflector while the wheat is discharged upon the same, the oats passing through spider 27, while the wheat passes through both of the spiders 29 and 27 in leaving the machine.

For collecting the wheat from the separating units C and D, a hopper 40 is employed which extends completely across the frame A and encloses both of the two open ends of cylinders 56 and 57 outwardly beyond the outer edge of the deflectors 39. This hopper is attached to frame A with brackets 64 and is directly connected to a feed chute J which is identical with the feed chutes H and I and which is adapted to feed into the cylinder 58 of separating unit B. In this manner the wheat from both of the conveyors 52 and 53 is discharged into separating unit B, where the small seed is removed from the same. In making this separation, the indentations in this cylinder are made slightly smaller than in the other three cylinders.

For collecting the oats from cylinders 56 and 57 of separating units C and D, I employ a hopper 63 which is quite similar to the hopper 40 and which is arranged to enclose the open portion of the cylinders 56 and 57 between the outer edges of deflectors 39 and the ends of said cylinders. This hopper is directly connected to a feed chute K identical with chute J, which is adapted to feed into cylinder 55 in a similar manner. If desired, hopper 63 may be rigidly secured to hopper 40 and supported thereby.

The operation of my invention is as follows: Raw wheat is fed into hopper 59 which divides the stream and runs it to the two feed chutes H and I. These feed the raw wheat into the two cylinders 56 and 57 of separating units C and D. Both of these separating units work alike and cause the wheat to be carried upwardly along the sides of cylinders 56 and 57 and to be discharged into the conveyors 52 and 53 while the oats rolls about in the bottom of the said cylinders where the same finally discharges from the ends of said cylinders into the hopper 63. Hopper 63 conducts the oats into said chute K which discharges the same is re- into separating unit E where the same is re-cleaned, the wheat being raised and thrown into conveyor 51 in said separating unit E, while the oats, as before, rolls along about the bottom of said cylinder to its discharge end. In a similar manner, the wheat which is discharged from the two conveyors 52 and 53 of separating units C and D is conducted by the hopper 40 into the chute J of separating unit B where the small seeds are separated from the wheat and thrown into conveyor 54, the cleaned wheat being discharged as tailing from the end of cylinder 58.

For maintaining the separation of the grains within the separating units B and E at the discharge end of the same, deflectors 39 are again employed, the same as with the separating units C and D. Two individual hoppers 65 are, however, employed which are similar to the hopper 40 but which do not connect the two cylinders. The construction of these hoppers is best shown in Figure 2. These two hoppers may be attached to the framework of the invention by means of brackets 66, similar to the brackets 64. In addition to the hopper 65, two hoppers 67 are employed which are attached to the hopper 65 and which function in the same manner as the hoppers 63. These hoppers, however, do not connect both of the separating units B and E but operate separately, the same as the hoppers 65. In this manner, the tailings or troughs from either of the separating units B or E may be directed to any desirable bins.

For driving the various units of my invention, I provide a driving pulley 70 which is preferably attached to shaft 32 and may be driven from any suitable source of motive power. This pulley is positioned at the end of the machine opposite from the hopper 59. At the other end of the machine, the shafts 30, 31, 32 and 33 extend outwardly beyond the spouts and framework of the machine and have attached to them sprocket wheels 76, 77, 78 and 79, over which a single chain 80 passes, which chain is adapted to drive all the cylinders of the various separating units from the shaft 32 to which the power is imparted. In this manner, all of the cylinders are driven in the same direction and at the same rate of speed, though it can readily be comprehended that different speeds for the different cylinders may be easily secured, by changing the sizes of the various sprockets 76, 77, 78 and 79.

The advantages of my invention are manifest. A device is provided in which the grain may be thoroughly cleaned and the oats and small seeds separated from the same. The machine is very efficient in its operation and removes the smallest trace of wheat from the oats in the re-cleaning cylinder thereof. An extremely simple device is provided in each of the units of which but a single shaft is employed which serves to operate both the cylinder and conveying means associated therewith by a direct drive. With my invention, the length of the cylinder may be made as long as desired so that the grains may be well separated, which together with the small seed separating unit and the other re-cleaning unit delivers the clean wheat and effects a thorough separation of the same.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:

1. A grain separator comprising a cylinder, a conveyor within said cylinder co-axially mounted relative thereto, spiders for supporting said cylinder and conveyor at one end, said cylinder and conveyor being adapted to discharge through said spiders, and means for separating the tailings from said cylinder and discharge from said conveyor as the same passes through said spiders.

2. A grain separator comprising a shaft, a cylinder co-axially mounted relative thereto, a conveyor trough co-axially mounted relative to said shaft, said conveyor trough and cylinder terminating at substantially the same plane, a spider secured to said cylinder and rotatably mounted upon said shaft having arms extending outwardly from said cylinder, a second spider mounted upon said shaft and secured to said conveyor trough, said second spider having arms extending outwardly from said conveyor trough and a conical shaped deflector secured to said first named spider and extending outwardly to meet said conveyor trough for separating the tailings from said cylinder and the discharge from said conveyor trough.

3. A grain separator comprising four separating units each comprising a cylinder and a conveyor, said units being arranged in tandem with two above the other, means for simultaneously feeding both of said upper units, means for conducting the discharge from the cylinders of said upper units to one of said lower units and means for conducting the discharge of both of said upper conveyors to the other of said lower units.

4. A grain separator comprising a cylinder, a shaft for supporting said cylinder, a spider positioned within said cylinder near one end thereof having an inwardly extending flange and secured to said shaft and cylinder, a flange formed on the end of said cylinder having a central opening, a conveyor trough co-axially mounted relative to said shaft and extending inwardly into said cylinder through said opening, a conveyor flight secured to said shaft and positioned within said trough for feeding said cylinder and a second conveyor positioned and mounted upon said shaft.

5. A grain separator comprising a cylinder having an indented body portion adapted to be operated at high speed, a shaft extending axially through said cylinder, a conveyor mounted on said shaft, a trough extending about said conveyor adapted to be held against rotation, said conveyor being supported by said shaft and adjustable means fixed to said trough extending through one end of said cylinder and forming a bearing for said shaft.

6. A grain separator comprising a frame, a pair of bearings upon said frame, a tube adjustably mounted in one of said bearings, a shaft rotatable within one of bearings and said tube, a conveyor trough mounted upon said shaft at one end and fixed to said tube at the other end and means for locking said tube in fixed position.

HAAKON MJOLSNESS.